(12) United States Patent
Giling et al.

(10) Patent No.: US 9,327,241 B2
(45) Date of Patent: May 3, 2016

(54) METHOD AND DEVICE FOR TREATING A CONTAMINATED ALKALINE AMINO ACID SALINE SOLUTION

(75) Inventors: Erwin Johannes Martinus Giling, Delft (NL); Earl Lawrence Vincent Goetheer, Mol (BE); Ralph Joh, Seligenstadt (DE); Rüdiger Schneider, Eppstein (DE); Johannes Van Der Meer, Loenen aan de Vecht (NL); Dirk Verdoes, Pijnacker (NL)

(73) Assignee: SIEMENS AKTIENGESELLSCHAFT, München (DE)

( * ) Notice: Subject to any disclaimer, the term of this patent is extended or adjusted under 35 U.S.C. 154(b) by 398 days.

(21) Appl. No.: 13/808,113

(22) PCT Filed: Jun. 8, 2011

(86) PCT No.: PCT/EP2011/059468
§ 371 (c)(1),
(2), (4) Date: Mar. 6, 2013

(87) PCT Pub. No.: WO2012/010371
PCT Pub. Date: Jan. 26, 2012

(65) Prior Publication Data
US 2015/0034867 A1   Feb. 5, 2015

(30) Foreign Application Priority Data
Jul. 22, 2010  (EP) ..................................... 10170449

(51) Int. Cl.
*B01D 53/96*   (2006.01)
*B01D 53/62*   (2006.01)

(52) U.S. Cl.
CPC ................ *B01D 53/96* (2013.01); *B01D 53/62* (2013.01); *B01D 2252/20494* (2013.01); *B01D 2257/504* (2013.01); *Y02C 10/04* (2013.01)

(58) Field of Classification Search
CPC .................. B01D 53/62; B01D 53/96; B01D 2252/20494; B01D 2257/504
See application file for complete search history.

(56) References Cited

U.S. PATENT DOCUMENTS

| 2,388,189 A | * | 10/1945 | Schweitzer | .................... 562/575 |
| 3,853,906 A | * | 12/1974 | Rogozhin et al. | .......... 548/339.1 |
| 4,180,548 A | | 12/1979 | Hays, Sr. | |
| 4,341,746 A | | 7/1982 | Cataneo | |
| 5,520,894 A | * | 5/1996 | Heesink et al. | ................ 423/230 |

FOREIGN PATENT DOCUMENTS

| EP | 0029536 | * | 6/1981 |
| RU | 2048847 C1 | | 11/1995 |
| RU | 2217497 C2 | | 11/2003 |
| WO | WO 03095071 A1 | | 11/2003 |

OTHER PUBLICATIONS

Ford, "The Alkaline Hydrolysis of B-Aminopropionitrile," J. Am. Chem. Soc., 1945, 67(5), 876-877.*

* cited by examiner

*Primary Examiner* — Paul A Zucker
*Assistant Examiner* — Mark Luderer

(57) ABSTRACT

A method for treating a contaminated alkaline amino acid salt solution is provided. First, carbon dioxide is introduced into the amino acid salt solution, with the result that carbonate or carbonate salts is or are precipitated, these being filtered off. The remaining filtrate is then cooled, amino acid or amino acid salts being crystallized out and likewise being filtered off. The amino acid or amino acid salt is then dissolved again, with the result that a treated amino acid salt solution is recovered.

6 Claims, 4 Drawing Sheets

METHOD AND DEVICE FOR TREATING A CONTAMINATED ALKALINE AMINO ACID SALINE SOLUTION

CROSS REFERENCE TO RELATED APPLICATIONS

This application is the US National Stage of International Application No. PCT/EP2011/059468, filed Jun. 8, 2011 and claims the benefit thereof. The International Application claims the benefits of European application No. 02020602.5 10170449.2 EP filed Jul. 22, 2010. All of the applications are incorporated by reference herein in their entirety.

FIELD OF INVENTION

The invention relates to a method for treating a contaminated solution, in particular a contaminated alkaline amino acid salt solution. The invention relates, furthermore, to an apparatus for treating a contaminated solution for the absorption of carbon dioxide.

BACKGROUND OF INVENTION

In fossil-fired power plants for generating electrical energy, the combustion of a fossil fuel gives rise to a flue gas containing carbon dioxide. To avoid or reduce emissions of carbon dioxide, carbon dioxide has to be separated from the flue gases. To separate carbon dioxide from a gas mixture, various methods are known in general. The method of absorption/desorption is customary particularly for separating carbon dioxide from a flue gas after a combustion process. In this case, on an industrial scale, carbon dioxide is washed out of the flue gas by means of an absorbent.

In a conventional absorption/desorption process, the flue gas is brought into contact in an absorption column with a selective absorbent as washing agent and is in this case absorbed by the washing agent. The absorbent, then laden with carbon dioxide, is conducted into a desorption column in order to separate the carbon dioxide and regenerate the absorbent. The laden absorbent is heated, carbon dioxide being desorbed again from the absorbent and a regenerated absorbent being formed. The regenerated absorbent is conducted once again to the absorber column where it can take up carbon dioxide again from the exhaust gas containing carbon dioxide.

Customary absorbents exhibit good selectivity and a high capacity for the carbon dioxide to be separated. Absorbents are especially suitable which are based on amines, such as, for example, monoethanolamine. In the chemical industry, too, amine solutions are usually employed as absorbents.

By the absorbent being in contact with the flue gas, a large quantity of contaminants from the flue gas and flue gas bi-products are introduced, in addition to the carbon dioxide, into the absorbent. Also due to constant thermal load, in the course of time the absorbent is damaged in an absorption/desorption process. The absorbent consequently has to be replaced continuously. In this case, a comparatively large quantity of unused absorbent, too, is always extracted from the absorption/desorption process together with the contaminants and degradation products.

When amine-based absorbents are used, the amines can be recovered by distillation. Amine solutions form, with the acid flue gas secondary components, stable salts. Owing to the distillative purification of the amine solution, that is to say owing to the evaporation of the more easily volatile amines and their subsequent condensation, it is possible to separate the high-boiling contaminants and therefore to purify the amine solution. However, the appreciable vapor pressure of the amines, which is utilized for distillative purification, also means that, during the absorption/desorption process, a small fraction of amines is discharged together with the purified flue gas into the environment, thus leading to undesirable air pollution. Moreover, the distillative purification methods necessitate a high outlay in energy terms.

By contrast, amino acid salts have no measurable vapor pressure and are therefore also not discharged together with the flue gas into the environment. However, for this reason, it is also not possible to carry out distillative processing of an amino acid salt solution. There has been no purification method known hitherto for an amino acid salt solution. The extracted quantity of used amino acid salt solution therefore has to be disposed of completely.

SUMMARY OF INVENTION

An object of the invention is to specify a method for treating a contaminated alkaline amino acid salt solution, which method can be employed on an industrial scale and has high efficiency. A further object of the invention is to specify an apparatus for treating a contaminated alkaline amino acid salt solution, which apparatus can be integrated into a carbon dioxide separation apparatus.

The object is achieved by the features of the independent claim(s).

In a first process step, carbon dioxide is introduced into the amino acid salt solution, carbonate and/or carbamate salts being precipitated. In a further, second process step, the precipitated carbonate and/or carbamate salt is filtered off, a filtrate being obtained. In yet a further, third process step, the filtrate is cooled, with the result that amino acid and/or amino acid salt are/is crystallized out. In a further, fourth process step, finally the amino acid and/or amino acid salt are/is filtered off. The amino acid and/or amino acid salt are/is then dissolved again in a fifth and last process step, so that a treated amino acid salt solution is thereby recovered.

The invention proceeds in this context from the idea of treating a contaminated alkaline amino acid salt solution by selective crystallization. The invention in this case makes use of the fact that the crystallization behavior of amino acids is highly dependent on the pH value. The crystallization behavior of amino acids is illustrated in FIG. 6. The graph shows a typical dependence of the solubility of amino acid salts upon the pH value.

The amino acid salt solutions used in absorption/desorption processes usually exhibit a very high pH value of between approximately 10 and 13. Under these conditions, the amino acid is present as carboxylate. Due to the negative charge of carboxylate, it is highly soluble in water. The invention, then, provides for lowering the water solubility of the amino acid by lowering the pH value Amino acids show the least water solubility at what is known as the isoelectric point. There, the carboxylate form and the ammonium form of the amino acid are in equilibrium with one another (dipolar ion). However, crystallization, to achieve an especially high yield, does not have to take place exactly at the isoelectric point. The optimal pH value for crystallization for methylalanine potassium is, for example, around 9.0 to 9.5.

It is especially advantageous to use carbon dioxide in order to lower the pH value, since carbon dioxide is a component present in the overall process. Moreover, the overall process comprises a desorption process, and therefore the carbon dioxide can be removed from the treated amino acid salt solution again in the desorption process, in order once more to achieve the necessary alkalinity of the amino acid salt solution.

Depending on the reaction route which the amino acid salt preferably adopts, during gassing with carbon dioxide primarily the carbonate of the amino acid or else bicarbonate or carbonate is formed. In the case of bicarbonate-forming amino acid salts, the bicarbonate formed is often still less soluble than the amino acids themselves, so that, even during gassing, the alkali hydrocarbonate with carbon dioxide usually precipitates potassium hydrocarbonate. The crystalline solid is filtered off and the remaining mother liquor is delivered to a crystallization reactor where the solution is cooled. The amino acid is in this case precipitated in pure form.

By virtue of the method according to the invention, it is possible for the first time to separate contaminants which occur in small concentrations in an amino acid salt-based solvent by being introduced by the flue gas or by the degradation of the solvent. In this case, the pH value of the amino acid is influenced by the addition of carbon dioxide such that the pure amino acid crystallizes out and the contaminants can be separated together with the remaining solution (mother liquor). The amino acid salt can subsequently be dissolved again and reused as an active substance in a solution.

The method is also suitable for amino acid salt solutions, the amino acid of which preferably forms carbamate instead of bicarbonate.

In an advantageous optimization step of the method, the contaminated alkaline amino acid salt solution is upgraded before carbon dioxide is introduced. A higher yield of crystallized amino acid can thereby be achieved. Moreover, less amino acid salt, which has to be disposed of together with the separated contaminants, remains in the remaining solution (mother liquor).

The upgrading of the amino acid salt solution in this case advantageously takes place, using low-pressure vapor which is present in any case in the overall process. The overall process comprises a separation apparatus for carbon dioxide, for which vapor is likewise required for the desorption process. Furthermore, the overall process comprises a fossil-fired power station process in which hot vapor for the recovery of energy is generated. By the amino acid salt solution being upgraded, solvent is evaporated, which is cooled in a following condensation process and is condensed into a condensate.

The condensate can then advantageously be used again for dissolving the filtered-off amino acid or amino acid salt and therefore for recovering a treated amino acid salt solution. The condensate is thereby kept largely in circulation, and there is therefore no need for additional introduction of a solvent (water).

In a further advantageous refinement of the method, the precipitated carbonate or carbonate salts is or are likewise dissolved again in the treated amino acid salt solution. Thus, potassium is delivered again to the treated amino acid salt solution, so that an absorbent for the selective absorption of carbon dioxide is formed. Carbonate or carbonate salts in this case comprises or comprise carbonate and bicarbonate salts. Without the use of the carbonate or carbonate salts obtained by precipitation in the method, the treated amino acid salt solution would otherwise have to be additionally enriched with potassium bicarbonate again.

The mother liquor occurring after the method has been carried out contains not only the contaminants, but also comparatively large quantities of dissolved amino acid. It is therefore advantageous to return a substream of the mother liquor to the evaporator again and thus deliver it a further time for purification.

The method is employed especially advantageously when integrated into a separation process for carbon dioxide. The separation process in this case comprises an absorption process and a desorption process. It is thereby advantageously possible that the carbon dioxide required for introduction into the method is taken directly from the desorption process for carbon dioxide. Thus, a component present in the overall process is used, and the additional provision of a substance for lowering the pH value may be dispensed with.

The desorption process present in the overall process may in this case likewise advantageously be used in order to desorb again the carbon dioxide contained in the treated amino acid salt solution, in order thereby to achieve again the necessary alkalinity of the amino acid salt solution for the selective absorption of carbon dioxide in the absorption process of the separation process.

The object of the invention directed at an apparatus is achieved, according to the invention, by means of an apparatus for treating a contaminated absorbent for carbon dioxide, with a first reactor, with a first filter which is connected to the first reactor via a line, with a second reactor which is connected to the first filter via a line, with a second filter which is connected to the second reactor, and with a dissolver which is connected to the second filter.

The method according to the invention is advantageously operated in the apparatus for treating a contaminated absorbent.

The apparatus can be operated especially advantageously when it is integrated into a separation apparatus for carbon dioxide. The separation apparatus comprises an absorbent circuit and a reservoir for carbon dioxide. The first reactor is in this case connected to the reservoir via a line for delivering carbon dioxide and to the absorbent circuit via a line for delivering a contaminated solvent. As a result, an absorbent to be treated can be conducted directly out of the absorbent circuit into the apparatus for treating the contaminated absorbent. And even already separated carbon dioxide from the separation apparatus can be used for the apparatus.

In an advantageous refinement of the apparatus, the first reactor is preceded by an evaporator. The evaporator is connected to a vapor line, so that it can be heated by means of a deliverable vapor. The vapor line connects the evaporator, for example, to a steam generator of a fossil-fired power plant. As a result, steam from the power plant, available in any case during operation, can be used for heating the evaporator, and therefore additional heating energy for the evaporator is saved.

In an advantageous further development of the apparatus, the evaporator is connected to the dissolver via a line. Condensed vapor can be delivered via the line to the dissolver as solvent from the evaporator. The condensed vapor from the evaporator can therefore continue to be used, and no additional component has to be introduced as solvent from outside. Furthermore, in an expedient further development, the first filter, too, is connected to the dissolver via a line. An amino acid salt precipitating in the first reactor can consequently be used again in the dissolver.

BRIEF DESCRIPTION OF THE DRAWINGS

Exemplary embodiments of the invention are explained in more detail below by means of accompanying diagrammatic drawings in which.

DETAILED DESCRIPTION OF INVENTION

Figure 1:
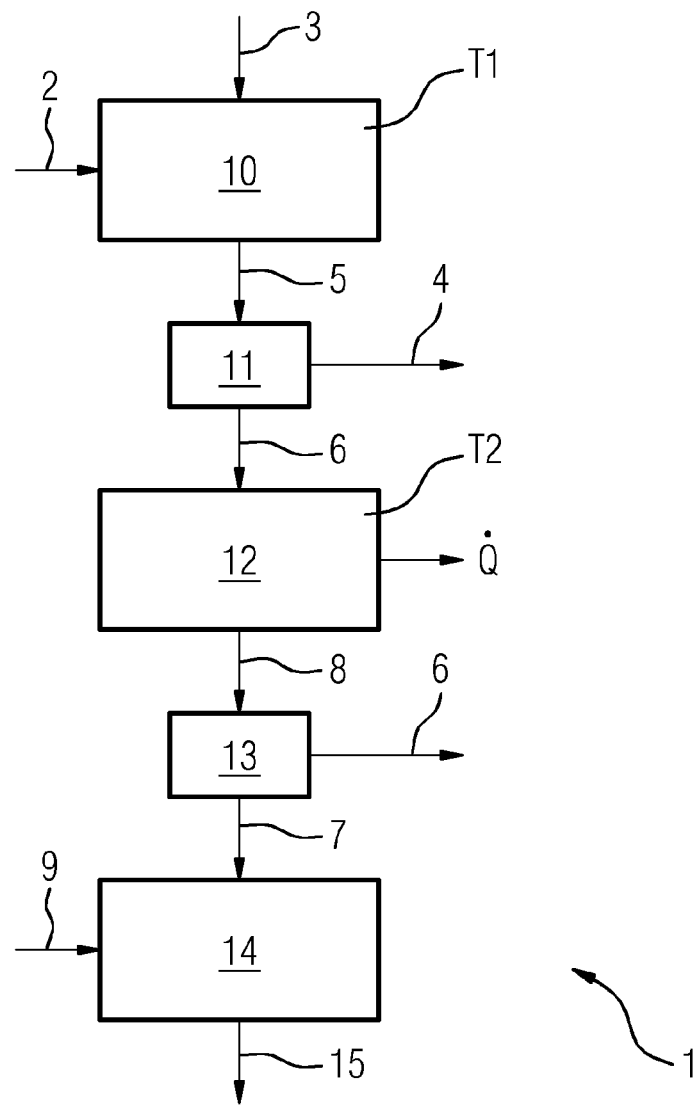
FIG. 1 shows a method for treating a contaminated alkaline amino acid salt solution.

The treatment method 1 shown in FIG. 1 comprises essentially five successive method steps.

In the first method step 10 of the treatment method 1, carbon dioxide 2 and a contaminated amino acid salt solution 3 are introduced. The first method step 10 in this case preferably takes place at a temperature T1 of between 50 and 70° C. Moreover, it is advantageous if the carbon dioxide 2 is introduced into the contaminated amino acid salt solution 3 by stirring or mixing. By the contaminated amino acid salt solution 3 being brought into contact with the carbon dioxide 2, carbonate or carbonate salts 4 is or are precipitated. A suspension 5 of carbonate or carbonate salt and mother liquor 6 leaves the method step 10 and is delivered to the second method step 11.

In the second method step 11, the precipitated carbonate or carbonate salt 4, for example potassium hydrocarbonate, is filtered off from the mother liquor 6 and is discharged separately from the mother liquor 6 out of the method step 11.

The mother liquor 6 is delivered to the third method step 12. In the third method step 12, heat $\dot{Q}$ is extracted from the mother liquor 6. A temperature T2 of between 10 and 50° C. is preferably set. As a result, the mother liquor 6 is cooled and crystallization of amino acid or amino acid salt 7 occurs. A suspension 8 of amino acid or amino acid salt 7 and mother liquor 6 leaves the third method step 12 and is delivered to the fourth method step 13.

In the fourth method step 13, the crystallized amino acid or amino acid salt 7 is filtered off from the mother liquor 6 and is also discharged separately from the mother liquor 6 out of the fourth method step 13. The crystallized amino acid or amino acid salt 7 is then delivered to the fifth method step 14.

In the fifth method step 14, the recovery of a treated amino acid salt solution 15 takes place. For this purpose, the crystalline amino acid salt 7 and a solvent 9 are delivered to the fifth method step 14 and the crystalline amino acid salt 7 is dissolved in the solvent. The treated amino acid salt solution 15 in this case formed is discharged out of the fifth method step 14.

Figure 2:
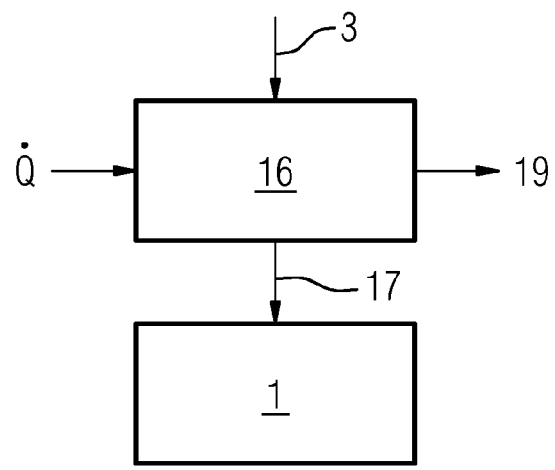
FIG. 2 shows an upgrading process preceding the method shown in FIG. 1.

FIG. 2 shows an advantageous development of the treatment method 1 illustrated in FIG. 1. For this purpose, the treatment method 1 is preceded by an upgrading process 16. For the sake of clarity, an embodiment in which the upgrading process 16 is an integral part of the treatment method 1 is not additionally shown. The contaminated amino acid salt solution 3 and heat energy $\dot{Q}$ are delivered to the upgrading process 16, with the result that the contaminated amino acid salt solution 3 is upgraded. The delivered heat energy $\dot{Q}$ may be transferred by means of hot vapor 18 which is provided by a steam generation process of a power station process. By the contaminated amino acid salt solution 3 being upgraded, solvent is evaporated and is discharged in the form of condensate 19, separately from an upgraded amino acid salt solution 17, out of the upgrading process 16. The upgraded amino acid salt solution 17 is delivered to the following treatment method 1.

Figure 3:
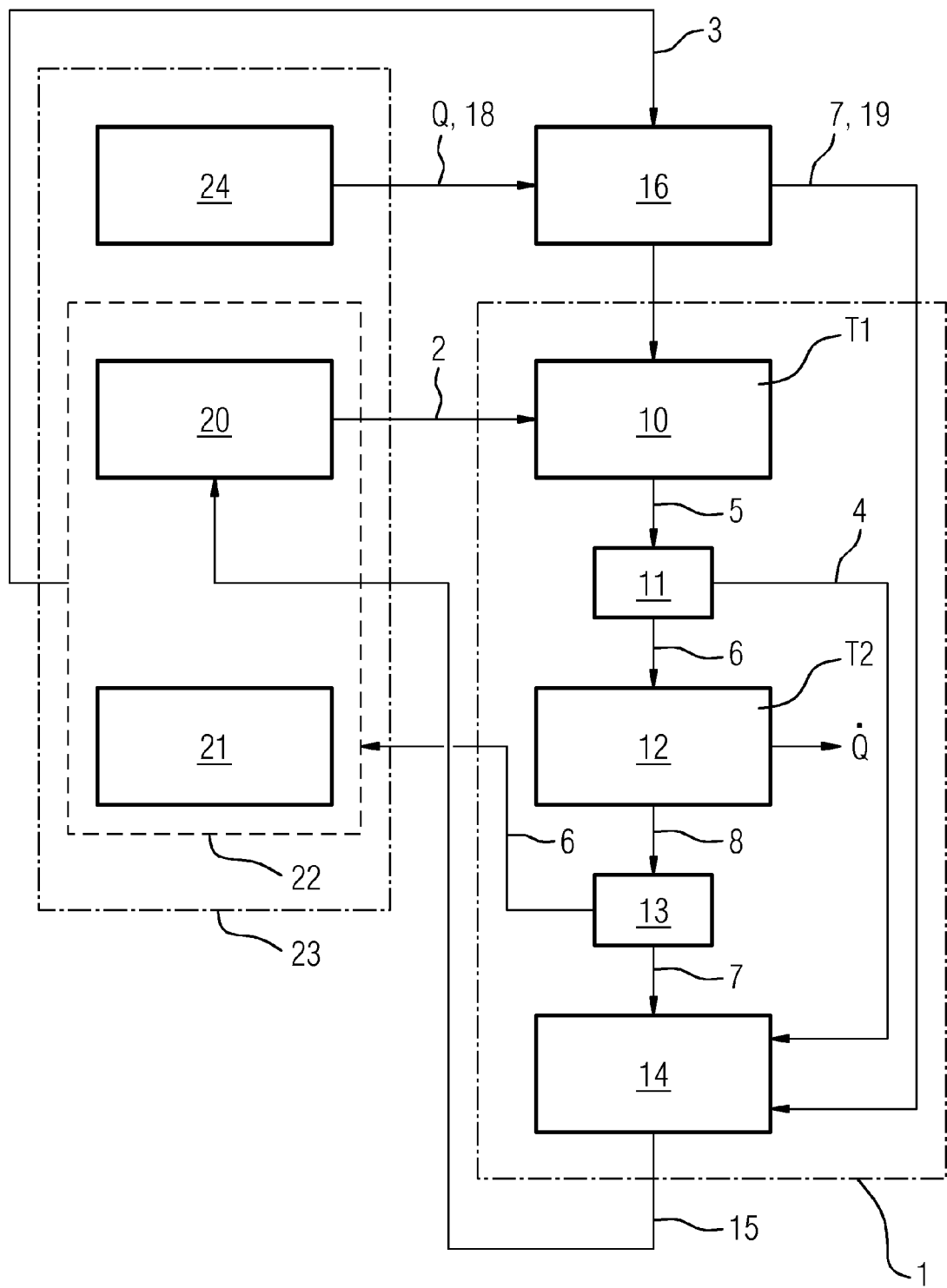
FIG. 3 shows a further development of the method from FIG. 1 and FIG. 2.

FIG. 3 shows an advantageous further development of the treatment method 1. Illustrated are essentially the first method step 10 up to the fifth method step 14, the upgrading process 16 preceding the first method step 10, and a fossil-fired power station process 23. The power station process 23 in this case comprises a desorption process 20 and an absorption process 21.

In the further development of the embodiment of the invention according to FIG. 1 and FIG. 2, in the embodiment of FIG. 3 the condensate 19 is then delivered from the upgrading process 16 to the fifth method step 14. The condensate 19 in this case serves as a solvent 9 for dissolving the carbonate salt 4 and therefore for achieving a treated amino acid salt solution 15.

It is also shown that the contaminated amino acid salt solution 3 which is delivered to the upgrading process 16 is taken from the separation process 22.

Also illustrated is the delivery of carbon dioxide 2 to the first method step 10 from the desorption process 20. The desorption process 20 has a desorber and a reservoir or line for carbon dioxide 2 from which the carbon dioxide 2 is extracted.

The heat energy $\dot{Q}$ which is delivered to the upgrading process is taken in the form of hot vapor 18 from a steam generation process 24 of the power station process 23. In this case, preferably, hot vapor 18 with a temperature of between 100 and 150° C. is used.

The carbonate or carbonate salt 4 formed in the second method step 11 is conducted, together with the crystalline amino acid or amino acid salt 7, into the fifth method step 14. Finally, the amino acid salt solution 15 treated in the fifth method step 14 is returned to the separation process 22 and is conducted for desorption into the desorption process 20. The mother liquor remaining after the amino acid crystallization from the method step 13 is divided, one fraction being returned to the separation process 22 (recycled). The fraction which has to be discharged from the process and disposed of as waste is not illustrated here.

Figure 4:
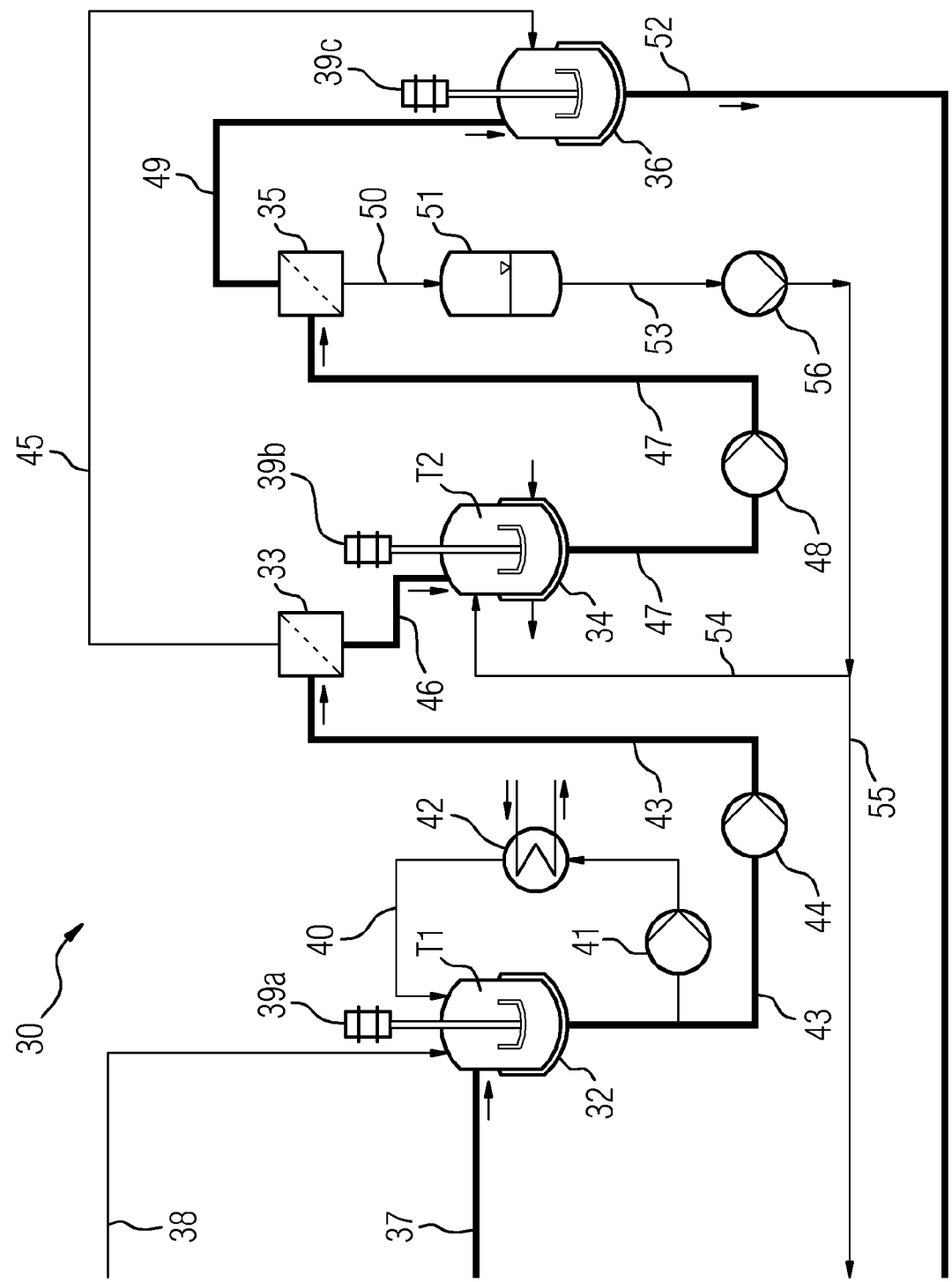
FIG. 4 shows an apparatus for treating a contaminated absorbent for carbon dioxide.

FIG. 4 shows an embodiment of the apparatus 30 according to the invention for treating a contaminated absorbent for carbon dioxide. The essential components for FIG. 4 are a first reactor 32, a first filter 33, a second reactor 34, a second filter and a dissolver 36.

The first reactor 32 has a delivery line for a contaminated absorbent 37 and a delivery line for carbon dioxide 38. The delivery line 37 is connected to a carbon dioxide separation apparatus (CO2 capture plant) for delivering a contaminated absorbent. The carbon dioxide separation apparatus is not illustrated here. The delivery line for carbon dioxide 38 is likewise connected to the carbon dioxide separation apparatus and serves for delivering carbon dioxide already separated from a flue gas.

The first reactor 32 comprises an agitator 39*a* and is connected into a cooling loop 40 into which a pump 41 and a cooler 42 are connected. By means of the cooler 42, heat energy can be discharged from the first reactor 32, with the result that a temperature T1 can be set in the first reactor 32. Other concepts for setting the temperature T1 may also be envisaged. For discharging a suspension, the first reactor 32 has a line 43. The line 43 connects the first reactor to the first filter 33. A pump 44 is connected into the line 43.

The first filter 33 is designed for separating a crystalline solid component, preferably potassium hydrocarbonate, from a liquid component. The first filter 33 has an outlet line 45 for transporting a filtered-off solid component and is connected to the second reactor 34 via a line 46.

The second reactor 34 likewise comprises an agitator 39b and can be cooled by the delivery of a cooling medium, so that a temperature T2 can be set. A line 47 is connected to the second reactor 34 for discharging a suspension. The line 47 connects the second reactor 34 to the second filter 35. A pump 48 is connected into the line 47.

The second filter 35, like the first filter 33, is likewise designed for separating a crystalline solid component, preferably the amino acid, from a liquid component. For this purpose, the second filter 35 has an outlet line 49 for transporting a filtered-off solid component and is connected to a collecting tank 51 via a line 50. The outlet line 49 connects the second filter 35 to the dissolver 36. The dissolver 36 is equipped with an agitator 39c, for example a disk agitator, which has the function of dissolving crystalline agglomerates again. For this purpose, a solvent, for example water, may also be delivered to the dissolver 36.

The outlet line 45 advantageously also connects the first filter 33 to the dissolver 36. A return line 52 is connected to the dissolver 36. What is not illustrated is that the return line 52 is connected to a separation apparatus for the carbon dioxide (CO2 capture plant) for the purpose of discharging a treated absorbent.

The collecting tank 51 is designed for a liquid component and has an outlet line 53 which branches into a first substream line 54 and a second substream line 55. A pump 56 is connected into the outlet line 53. The first substream line 54 is in this case connected to the second reactor 34. The second substream line 55 is intended for discharging a liquid component which has remained.

Figure 5:
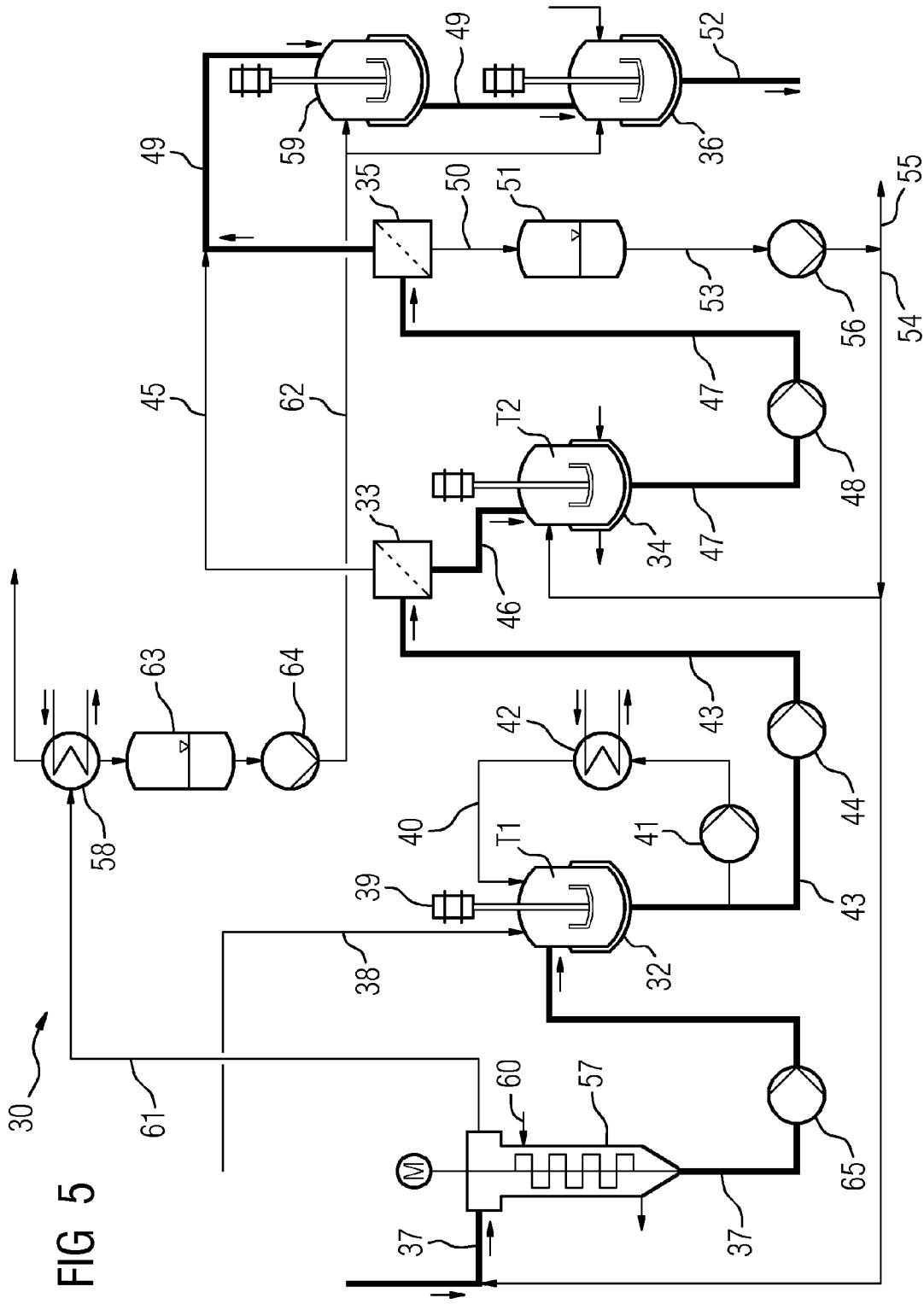
FIG. 5 shows a further development of the apparatus for treating a contaminated absorbent for carbon dioxide from FIG. 4.

FIG. 5 shows a development of the apparatus 30 shown in FIG. 4. In contrast to FIG. 4, the exemplary embodiment of FIG. 5 additionally comprises essentially an evaporator 57, a condenser 58 and a solid collector 59.

The evaporator 57 is connected into the delivery line for a contaminated absorbent 37 and is designed as a film evaporator. Moreover, the evaporator 57 has connected to it a vapor line 60 which connects the evaporator 57 to a steam generator of a fossil-fired power plant and into which a pump 65 is connected. In addition to a suspension which can be discharged from the evaporator 57, a vapor can be discharged via a line 61. The line 61 connects the evaporator 57 to the condenser 58. Connected to the condenser 58 is a condensate line 62 which connects the condenser 58 to the solid collector 59. A collecting tank 63 and a pump 64 are connected into the condensate line 62.

In the exemplary embodiment of FIG. 5, the solid collector 59 is connected into the outlet line 49, and the outlet line 45 is also connected to the solid collector 59.

In the exemplary embodiment of FIG. 5, the first substream line 54 is connected to the second reactor 34 and also to the delivery line for a contaminated absorbent 37, with the result that a circuit for an absorbent is formed.

The invention clamed is:

1. A method for treating a contaminated alkaline amino acid salt solution, comprising the steps of:
   introducing carbon dioxide into the amino acid salt solution and consequent precipitation of carbonate and/or carbonate salts,
   filtering off of the precipitated carbonate and/or carbonate salts,
   cooling the filtrate and consequent crystallizing out of the amino acid and/or amino acid salt,
   filtering off of the crystallized amino acid and/or amino acid salt,
   dissolving the filtered-off amino acid and/or amino acid salt and consequently recovering a treated amino acid salt solution; and
   dissolving the precipitated carbonate and/or carbonate salts in the treated amino acid salt solution.

2. The method as claimed in claim 1, further comprising, before the introducing of carbon dioxide into the amino acid salt solution, introducing vapor at a temperature of from 100° to 150° C. into the amino acid salt solution such that a condensate is formed.

3. The method as claimed in claim 2, further comprising using the condensate for dissolving the filtered-off amino acid and/or amino acid salt.

4. The method as claimed in claim 1, wherein the introduced carbon dioxide is taken from a desorption process for carbon dioxide.

5. The method as claimed in claim 1, further comprising delivering the treated amino acid salt solution to a desorption process for carbon dioxide, wherein carbon dioxide contained in the treated amino acid salt solution is desorbed in the desorption process.

6. The method as claimed in claim 4, wherein the desorption process is integrated into a fossil-fired power station process.

* * * * *